April 8, 1924.

D. B. KING 1,489,836

BOTTLE OR VIAL MAKING MACHINE

Filed Sept. 19, 1922  3 Sheets-Sheet 1

WITNESS:
Rob R Ketchel

INVENTOR
David B. King
BY
Augustus B Stoughton
ATTORNEY.

April 8, 1924.

D. B. KING

BOTTLE OR VIAL MAKING MACHINE

Filed Sept. 19, 1922

WITNESS:
Robt R Kitchel

INVENTOR
David B. King
BY
Augustus B. Houghton
ATTORNEY.

April 8, 1924.

D. B. KING 1,489,836

BOTTLE OR VIAL MAKING MACHINE

Filed Sept. 19, 1922   3 Sheets-Sheet 3

WITNESS:
Rob't R. Kitchel.

INVENTOR
David B. King
BY
Augustus B Stoughton
ATTORNEY.

Patented Apr. 8, 1924.

1,489,836

UNITED STATES PATENT OFFICE.

DAVID B. KING, OF MILLVILLE, NEW JERSEY, ASSIGNOR, BY MESNE ASSIGNMENTS, TO KIMBLE GLASS COMPANY, OF LANDIS TOWNSHIP, NEW JERSEY, A CORPORATION OF ILLINOIS.

BOTTLE OR VIAL MAKING MACHINE.

Application filed September 19, 1922. Serial No. 589,091.

*To all whom it may concern:*

Be it known that I, DAVID B. KING, a citizen of the United States, residing at Millville, in the county of Cumberland and State of New Jersey, have invented a new and useful Improvement in Bottle or Vial Making Machines, of which the following is a specification.

The principal object of the present invention is to improve the feed of the blanks or sections of tubing to and through the machine in such a way that production is expedited, while at the same time dwells in the feed necessary for the completion of the various operations on the tubes are provided. Another object of the invention is to provide a compact, simple, reliable and comparatively inexpensive machine for making bottles or vials from tubes. Other objects of the invention will appear from the following description and the invention itself will be claimed at the end hereof after having been described in connection with the embodiment of it selected from other embodiments for the sake of illustration in the accompanying drawings forming part hereof and in which—

Figure 2:
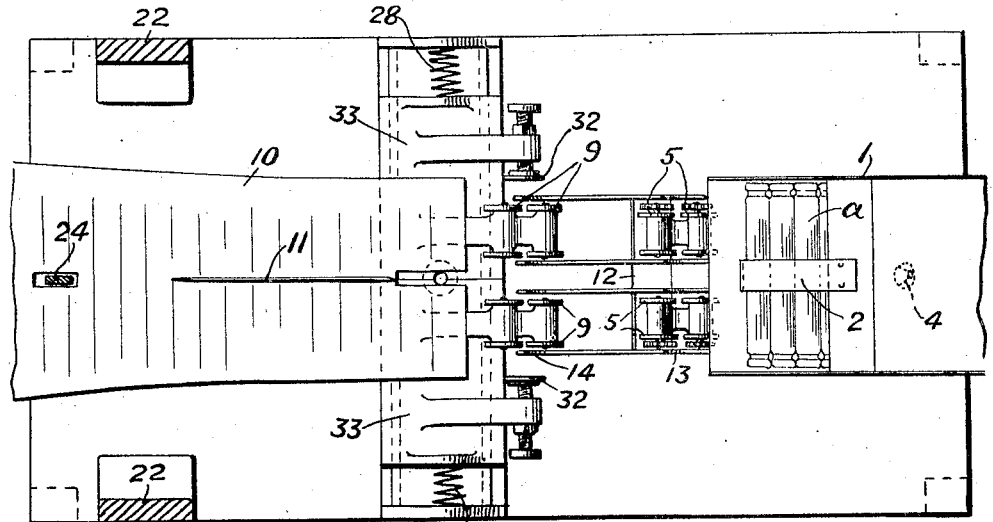
Figure 2 is a top or plan view of parts of the mechanism shown in Figure 1, with some of the superstructure removed for the sake of clearness.

Referring to the drawings, 1 is a hopper having an inclined floor and provided with a spring closure 2 and is supplied with the tubular glass blanks *a*. 3 is a reciprocating gate which is adapted to pass behind a blank at the exit of the hopper and to lift the closure 2 to permit of the escape of blanks one at a time. 4 is an agitator pivotally connected with gate 3 and adapted to stir up blanks *a* in the hopper 1 in order to insure the descent of the blanks toward the outlet of the hopper. At the discharge end of the hopper and arranged to receive blanks therefrom are rolls 5, of which eight are shown arranged in pairs, these rolls 5 being positively driven as by means of gearing 6, indicated in dotted lines, from a drive shaft 7, to which power is applied. Associated with the central space between these rolls 5 is a burner or burners 8, the object being to permit a blank to remain on and be revolved by the rolls 5 for a sufficient length of time to permit the burner 8 to preheat its center portion without delaying the operations that are subsequently performed on the blank and which will be described.

There are revoluble rollers 9, of which eight are shown arranged in pairs and spaced from the rolls 5, and these rollers 9 receive and support blanks preheated on the rolls 5, while the blanks are worked on to draw them apart and form bottoms on the separated parts as will be presently described. From the rollers 9 the finished bottles or vials are delivered to a chute 10 on opposite sides of a rib or partition 11. 12 is an arm provided with two sets of fingers 13 and 14. The fingers 13 serve to transfer the blanks from the rolls 5 to the rollers 9, and the fingers 14 serve to transfer two finished vials from the rollers 9 to the chute 10, at the same motion of the arm, which is a comparatively quick motion, whilst the return of the arm to its initial position shown in Figure 1 is a comparatively slow motion, allowing time for the necessary heating of the glass.

The movement of the arm 12 referred to is provided by the slot 15 formed in it and receiving a fixed pin 16 and by connecting the arm with a rotating element, which, in the present instance, is a cam 17 positively driven by a portion of the gearing 6.

Figure 1:
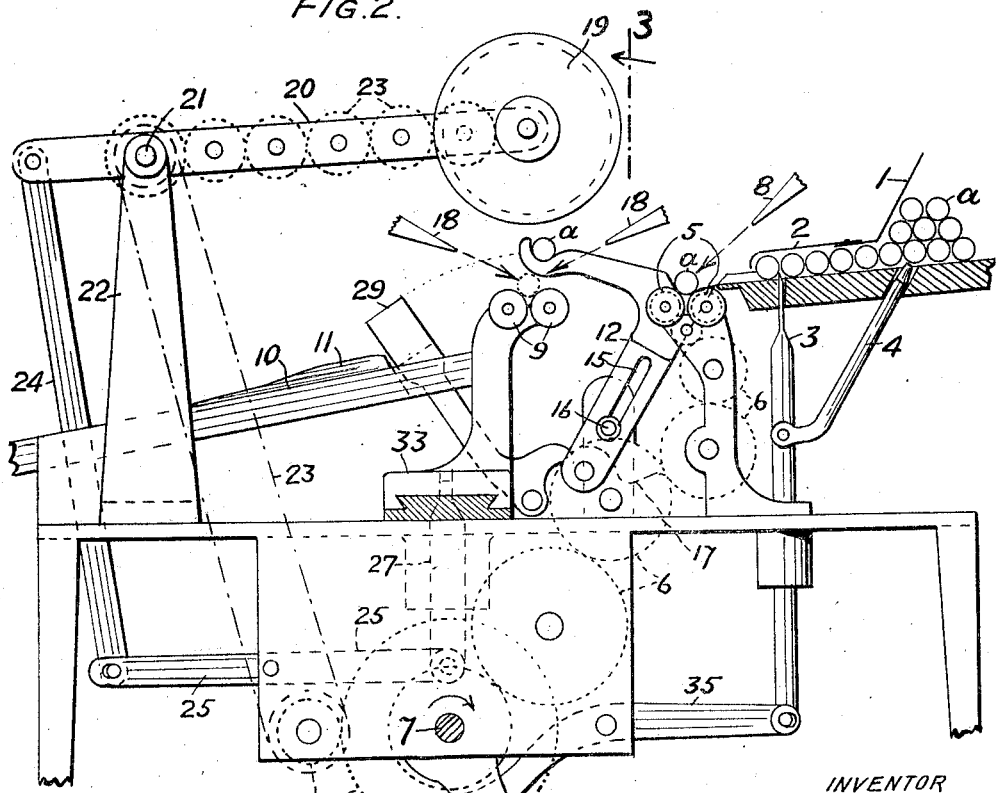
Figure 1 is an elevational view, partly in section, illustrating mechanism embodying features of the invention.
Figure 3:
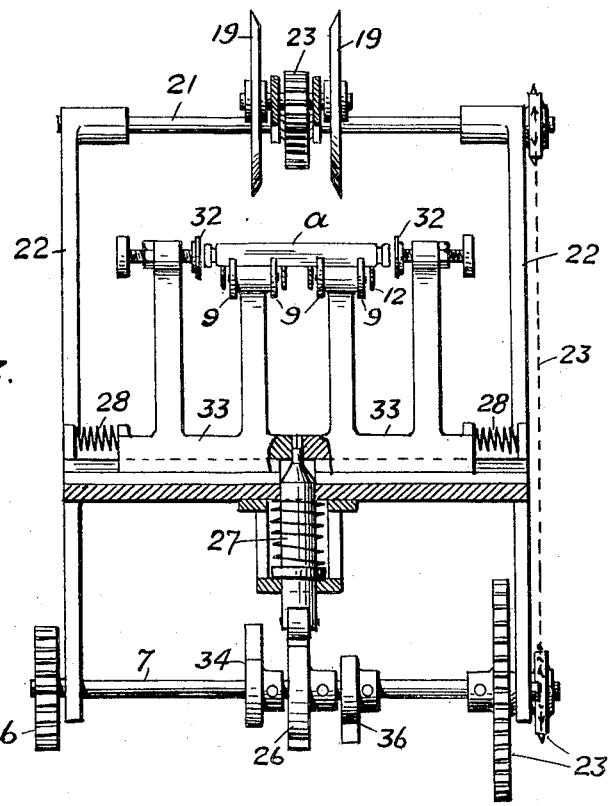
Figure 3 is an elevational view, partly in section, on the line 3—3 of Figure 1.
Figure 4:
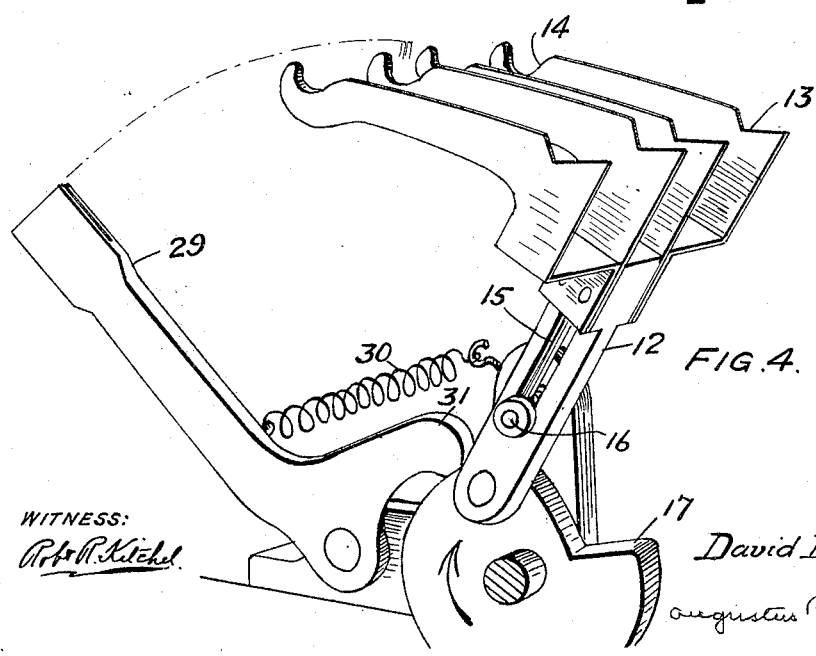
Figure 4 is a perspective view of a portion of the mechanism.
Figure 5:
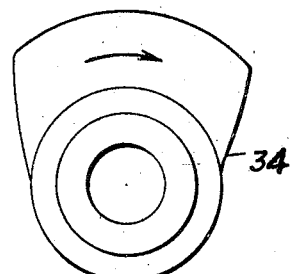
Figures 5 and 6 are views respectively of the cam which actuates the hopper feed and of the cam which controls the mechanism used in the bottoming operation.
Figure 6:
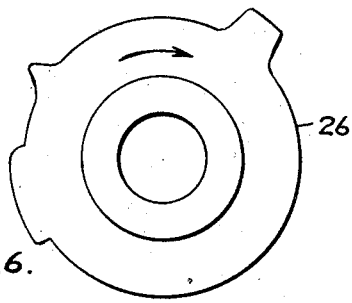
Figure 7:
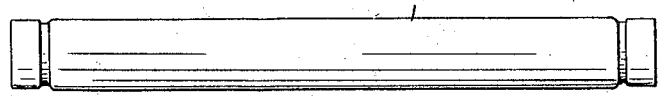
Figure 7 is a view of a tube or blank having at its ends finished portions, and such as is fed to the machine, and Figures 8 to 11 inclusive illustrate steps in the separation of the tube and in the formation of bottoms on the separated parts.
Figure 8:
Figure 9:
Figure 10:
Figure 11:
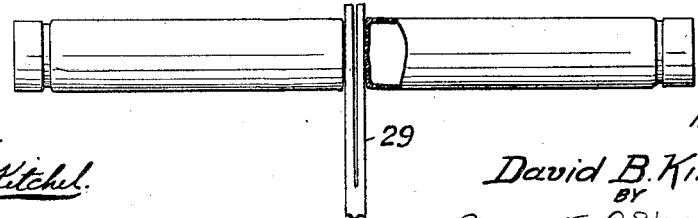

Starting from the position just preceding that shown in Figure 1 and when the element 17 is rotated in the direction indicated by the arrow in Figure 4, the arm is lifted so that its fingers 13 engage the blanks and its fingers 14 engage the finished vials, and then the upper end of the arm is turned toward the left with a comparatively quick motion. The arm then slides on the pin so that the fingers are lowered, depositing the preheated vials on the rollers 9, and the finished vials on the table or chute 10, and then the fingers are returned to their initial position with a comparatively slow motion. In consequence of this there is provided sufficient dwell for preheating the blanks and for forming the bottoms of vials, whilst the feed of the preheated blanks is rapid. A blank on the rollers 9 having been preheated on the rolls 5 is further heated by the burners 18, and at the same time is subjected to the action of the driven beveled rollers 19 which revolve the blank and tend to separate it at the center where it is heated into two parts as shown in Figure 8. The action of the rolls 19 also pushes the ends of the blanks against the back stops 32. These rollers 19 are of rubber or other like material and are provided with beveled rims for the purpose described. The rollers 19 are mounted on the end of arm 20 pivoted at 21 to standards 22 and they are driven from the shaft 7 as by means of gearing 23. The arm 20 is connected by a link 24 and with a follower 25 that co-operates with a cam 36 on the shaft 7. A cam 26 operates a spring retracted wedge lever 27, which works in between the slides 33 that carry the pairs of rollers 9, and operates to push these slides apart against the springs 28 and to permit them to approach each other (see Figure 3). The cam 26 operating to shift the pairs of rollers 9 apart, causes the blank to be separated in the middle where the application of heat assists in the separation, Fig. 9. Then the rollers 9 approach each other to bring the bottoms into the direct influence of the flame to square them, as shown in Figure 10. The rollers are again separated and whilst the rollers 9 are separated the cam 17 which has held the bottomer or blade 29 in the position shown in Figs. 1 and 4 against the tension of its spring 30 permits the arm 31 on the blade 29 to fall into the low part of the cam 17, thus driving the blade 29 between the ends of the sections of the blank as shown in Fig. 11, whereupon the wedge device 27 is withdrawn and bumpers 32 adjustably mounted on the slides 33 are caused under the action of the springs 28 to press or drive the two sections of the blank against the blade 29 as shown in Fig. 11, and in that way the bottoms of the blanks are completed. Cam 34 on the driven shaft 7 is provided with a follower 35 which operates the gate 3.

The mode of operation of the described machine may be explained as follows: Blanks are fed singly from the hopper onto the rolls 5 where they remain long enough to be centrally preheated, while at the same time blanks on the rollers 9 are being cut in two and each part provided with a bottom. The arm 15 by the fingers 13 conveys preheated blanks from the rolls 5 to the rollers 9 and simultaneously the fingers 14 convey the finished product to the chute 10 on each side of the partition 11. This is accomplished with a quick motion of the arm and the return motion of the arm is comparatively slow so as to get time for the completion of the described operations. The shifting of the slides 33, and the rollers 9 which they carry by the described wedge-like mechanism and springs 28, performs an important function in drawing the tube into two parts and in subsequently bumping these parts against the plate 29. Of course the feed to the machine from the hopper in connection with the other features makes the machine entirely automatic. It may be observed that the end of the blade 29 is notched and this provides some spring for taking up the impact of the bumpers 32 and it may also be said that the slides 33 are shown as movable crosswise of the machine on dove-tailed ways, Figure 1.

It will be obvious to those skilled in the art to which the invention relates that modifications may be made in details of construction and arrangement without departing from the spirit of the invention, which is not limited as to those matters or otherwise than as the prior art and the appended claims may require.

I claim:

1. In a machine of the class described the combination of a hopper, positively driven rollers arranged at the exit of the hopper, mechanism for positively feeding blanks one at a time from the hopper to said rollers, preheating burners associated with said rollers, revoluble rollers spaced from the driven rollers, burners associated with the central portion of the last mentioned rollers, an arm having two sets of fingers of which one is for transferring preheated blanks from the driven rollers to the revoluble rollers and of which the other is for delivering finished articles from the revoluble rollers, slot-and-pin and crank mechanism for actuating said arm, positively driven bottoming rollers co-operating with the revoluble rollers, a bottoming blade, slides upon which the revoluble rollers are mounted and which are provided with bumpers, mechanism for shifting the slides in respect to each other, means for actuating the bottoming blade, and provisions for actuating the bottoming rollers substantially as described.

2. In a machine of the type recited the combination of two sets of rollers adapted to support blanks and arranged in pairs spaced apart, an arm having two sets of fingers of which one delivers blanks from one set of rolls to the other set of rollers and of which the other fingers deliver the finished product from the second set of rollers, a slot-and-pin support for the arm, and crank means to operate the arm, substantially as described.

DAVID B. KING.